United States Patent [19]

Hanks

[11] 3,888,278
[45] June 10, 1975

[54] THERMAL-MAGNETIC SNAP ACTION VALVE

[75] Inventor: James V. Hanks, Minneapolis, Minn.

[73] Assignee: Horton Manufacturing Co. Inc., Minneapolis, Minn.

[22] Filed: Nov. 29, 1973

[21] Appl. No.: 420,297

[52] U.S. Cl. ............... 137/625.65; 251/75; 251/65
[51] Int. Cl. ..... F16k 11/07; F16k 31/00; F16k 1/06
[58] Field of Search ............. 137/625.65, 625.2, 66; 251/75, 65, 11, 297; 236/48 R, 48 A; 267/168

[56] References Cited
UNITED STATES PATENTS

| | | | |
|---|---|---|---|
| 1,258,164 | 3/1918 | Stuart | 137/625.65 X |
| 1,605,824 | 11/1926 | Erickson | 251/75 |
| 2,598,361 | 5/1952 | Dach | 251/65 X |
| 2,644,477 | 7/1953 | King | 251/65 X |
| 2,895,089 | 7/1959 | Leber | 137/625.65 X |
| 2,934,090 | 4/1960 | Kenann et al. | 251/75 X |
| 2,991,805 | 7/1961 | Page | 251/65 X |
| 3,383,084 | 5/1968 | Mayfield | 251/75 |
| 3,474,962 | 10/1969 | Visos | 251/75 X |
| 3,762,442 | 10/1973 | Paul | 251/65 X |

Primary Examiner—Martin P. Schwadron
Assistant Examiner—Robert J. Miller
Attorney, Agent, or Firm—Wicks & Nemer

[57] ABSTRACT

A snap action valve including a valve housing having an inlet, outlet and service ports, a valve member carried by said housing and movable in opposite directions to selectable positions to connect the service port with either the inlet port or the outlet port, together with magnetic means mounted in the housing which includes cooperating attracting and attractable magnetic members, one of a type of the magnetic members being fixed relative to the housing. Another of the other type of magnetic members being movable relative thereto and fixed relative to said valve member and guide means for guiding the movable magnetic member for movement toward or from the fixed magnetic member together with valve operating means for movement of the valve member to a selected position whereby the magnetic means is brought into action to accelerate such movement.

2 Claims, 5 Drawing Figures

PATENTED JUN 10 1975 3,888,278
SHEET 2
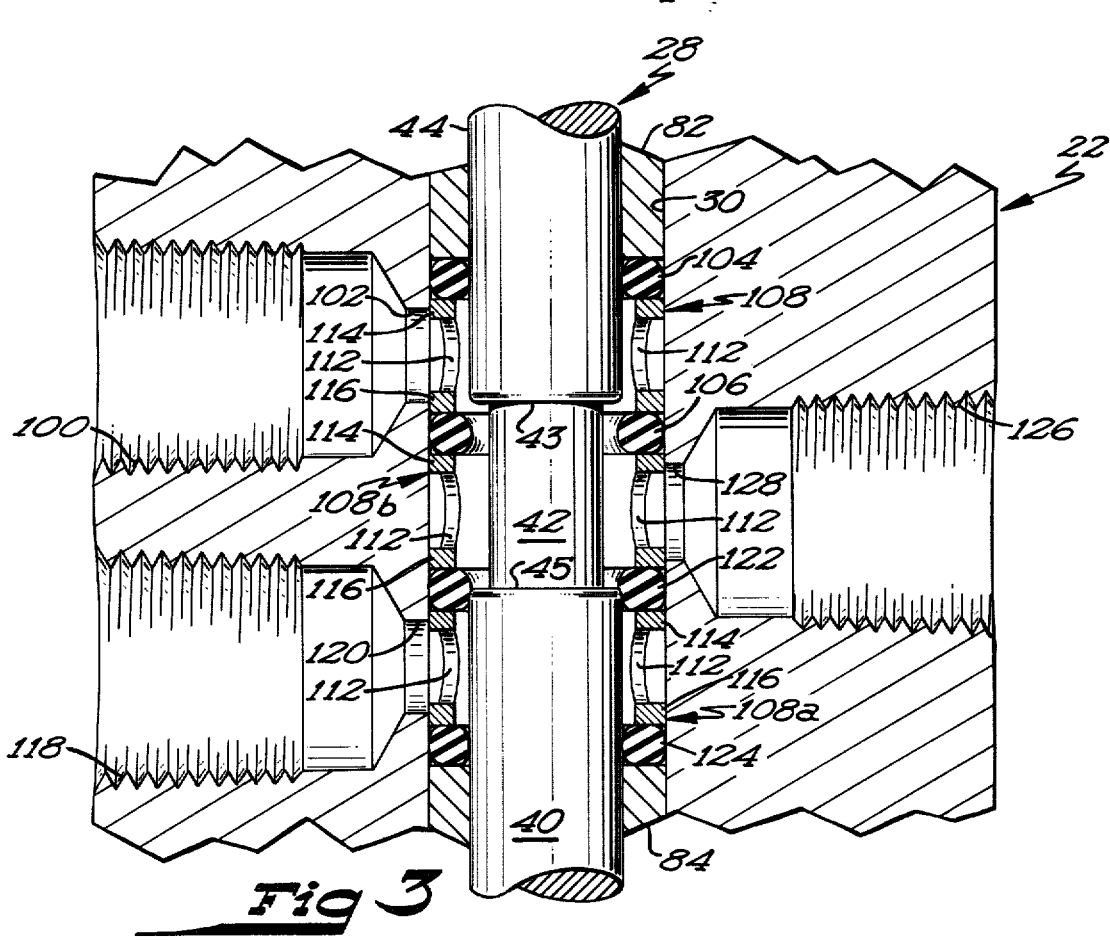
Fig 3
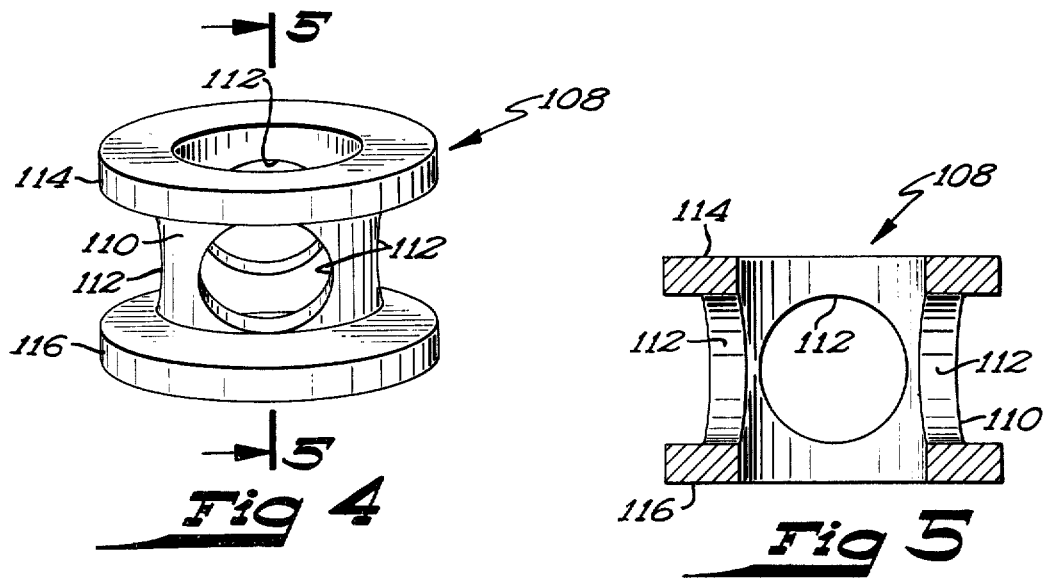
Fig 4
Fig 5

THERMAL-MAGNETIC SNAP ACTION VALVE

SUMMARY

The invention relates to an improvement in a snap action valve for a device such as a fan clutch for a diesel engine and more particularly to a valve having a snap-action thermally controlled. The snap action is in a direct acting valve. In the art there are known thermally energized direct acting valves but the same tend to modulate. That is such valves open slightly at the set temperature and then open wider as the temperature increases. With the subject invention the valve does not open until it snaps open all the way. When a valve is used to control, for example, an air operated friction clutch a snap action is vitally important due to the fact that an indecisive or intermittent air supply which allows modulation can allow the clutch to slip and burn out.

The art also includes thermally energized so called "snap acting" switches that control an electric solenoid that in turn operates an air control valve with the drawback that it requires both an electrical as well as a pneumatic power source and it introduces an additional component at extra cost. The subject valve provides a snap closing which creates an abrupt build up in air pressure to start a clutch or release it to stop it.

In the drawings forming part of this application:

FIG. 3 is an enlarged detail view of the valving and port area of the device as shown in FIG. 2.

FIG. 4 is a perspective view of a spacer removed from the valve.

FIG. 5 is a sectional view on the line 5—5 of FIG. 4.

Figures 1, 2:
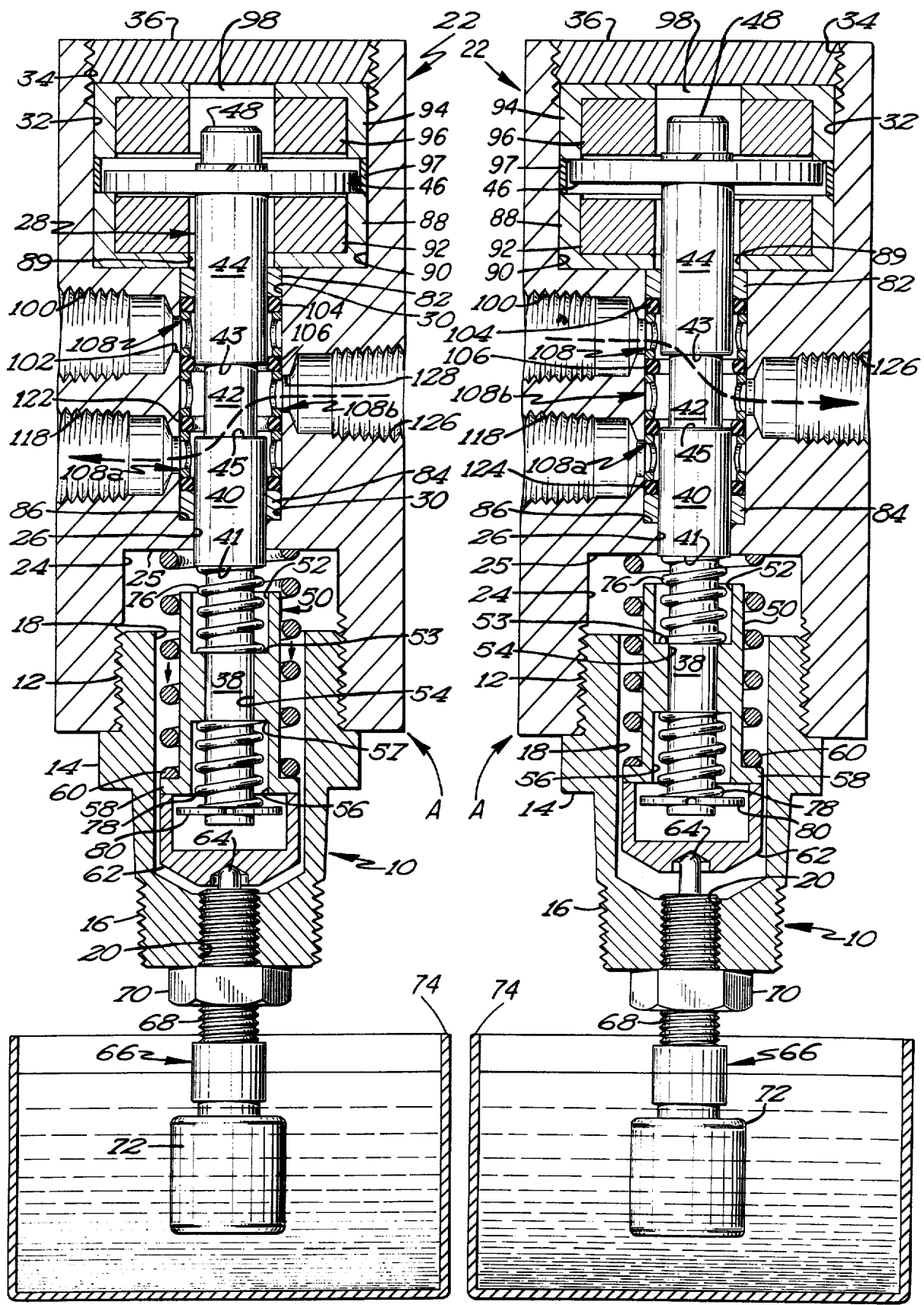
FIG. 1 is a longitudinal sectional view of a snap action valve embodying the inventions in the normally closed or exhaust condition.
FIG. 2 is a view similar to FIG. 1 but in the open or intake condition.

Referring to the drawings in detail, the valve A includes the substantially cylindrical housing mount 10 having the upper externally threaded end portion 12 which terminates in the annular flange 14. The flange 14 terminates in the externally threaded lower end portion 16. Extending into the mount 10 is the axial bore 18 which terminates at its lower end in the reduced and threaded bore portion 20. The end portion 16 of the mount 10 is threadedly mounted on the water jacket of an engine.

Further provided is the substantially cylindrical valve housing 22 which has formed in the lower end thereof the axial bore 24 which forms the shoulder 25 which terminates in the reduced guide bore portion 26. The reduced guide bore portion 26 mounts the spool valve member 28 and the bore 26 terminates in the bore portion 30 which extends upwardly to the upper bore portion 32. The outermost portion of the bore portion 32 is threaded as at 34 which receives the threaded plug member 36.

The spool 28 includes the lower reduced portion 38, the intermediate enlarged portion 40 forming the shoulder 41, the portion 40 slidably mounted in the bore portion 26. The enlarged portion 40 of the spool terminates in the intermediate reduced portion 42 which terminates in the upper portion 44 to the outer end of which is secured the attractable magnetic member in the form of circular magnet pole piece 46 by means of the bolt 48. The reduced portion 42 forms the upper annular shoulder 43 and the lower annular shoulder 45.

The numeral 50 designates a floating sleeve which has the upper bore 52, which terminates in the centrally disposed reduced bore 54 forming shoulder 53, the portion 54 slidably fitting on the spool portion 38. The bore 54 terminates in the lower bore 56 which forms the shoulder 57. Formed on the lower end of the sleeve 50 is the radially and outwardly extended flange 58. Mounted axially on the sleeve 50 is the pill loading coil spring 60 which abuts both the shoulder 25 of the housing 22 and the flange 58 thereby urging the pressure piece in the form of cup 62 upon the stem 64 of the conventional power pill or thermal motor 66. The sleeve 50 is in effect a floating ground point.

The power pill 66 includes the externally threaded tubular housing 68 the upper end of which threadedly engages the end portion 16 of the mount 10. Mounted on the tubular housing 68 is the keeper nut 70. The stem 64 extends through an axial bore in the tubular housing 68 to the lower end housing 72 in which is heat sensitive wax which expands on a temperature rise. The spring 60 puts a continual load on the power pill 66 through stem 64.

The container 74 represents a hot water manifold of an engine in which the power sensing pill 66 is immersed. The keeper nut 70 is used to adjust the position of the stem relative to housing 10 for adjustment of the trigger temperature setting. Mounted on the portion 38 of the spool 28 and between the shoulder 41 thereof and the shoulder 53 of the sleeve 50 is the resilient means in one form of the coil spring 76. The coil spring 76 loads the lower magnet hereinafter referred to and performs a carry through with energy storage.

The numeral 78 designates a coil spring which is also mounted on the portion 38 and is positioned between the keeper ring 80 secured to the lower end of the spool 50 and the shoulder 57 formed by the bore 56. The coil spring 78 loads the upper magnet hereinafter referred to and performs a carry through with energy storage. Positioned in the bore 30 and upon the spool 28 are the upper and lower guide bushings 82 and 84, respectively. The lower bushing 84 abuts the shoulder 86 formed at the juncture of the bores 30 and 26, and the upper bushing abuts the lower magnetic flux conductor cup 88 formed with the axial opening 89 and mounted in the annular cavity 90 formed in the upper end of the housing 22. The lower cup 88 has positioned therein the lower attracting ring magnetic member 92 through which extends the upper portion 44 of the spool 28.

Also mounted in the annular cavity 90 is the upper magnetic flux conductor cup 94 in which is mounted the attracting upper magnetic member 96. The bottom of the upper cup 94 is formed with the axial hole 98 and the bottom of the upper cup 94 abuts the plug 36. The magnets 92 and 96 are positioned with a void between the same in which the magnet pole piece 46 is movable. The void or spacing between the cups 88 and 94 is maintained by the spacer ring 97 made of non-ferrous material.

Formed in the housing 22 is a threaded inlet port 100 terminating in the reduced port portion 102 leading into the bore 30. Positioned on the upper portion 44 of the spool 28 and adjacent to and on each side of the port portion 102 are the spaced O-ring seals 104 and 106. The numeral 108 designates a first spacer which includes the tubular central portion 110 which mounts on the upper portion 44 of the spool valve member 28 and in which is formed the spaced openings 112 which allow passage of air. Extending radially from the tubular portion are the space annular flange portions 114 and 116. The spacer 108 is in alignment with the reduced port portion 102, particularly FIG. 3.

Also provided is a threaded outlet port 118 terminating in the reduced port portion 120 leading into the bore 30. Positioned on the intermediate spool portion 40 and adjacent to and on each side of the port portion 120 are the spaced O-ring seals 122 and 124. Positioned in alignment with the reduced port portion 120 and between the O-rings 122 and 124 is a second spacer 108 a and positioned between the O-rings 106 and 122 is a third spacer 108 b, all the spacers 108, 108 a and 108 b being identical. The O-ring 124 abuts the bushing 84 thus keeping all of the O-rings and spacers in position.

Also formed in the housing 22 is the threaded service port 126 terminating in the reduced port portion 128 which is in alignment with the spacer 108 b and the reduced portion 42 of the spool 28. The service port 126 may be connected to a conventional friction clutch not shown.

When the power pill 66 is in the fully retracted position as in FIG. 1, the outer corner of the shoulder 43 of the spool contacts the O-ring 106 which blocks fluid flow through the port 100. In such a position of the spool, the outer corner of the shoulder 45 is free of the O-ring 122 thus allowing fluid flow through the outlet port 118 all as shown by the arrow in FIG. 1.

When the power pill 66 is in the extended position as in FIG. 2, the outer corner of the shoulder 43 is free of the O-ring 106 thus allowing fluid flow through the port 100 as shown by the arrow in FIG. 2.

OPERATION

Let it be assumed that an air operated conventional friction clutch is connected to the service port 126 and the simulated engine manifold 74 is in a cooled condition with the power pill 66 and stem thereof in a fully retracted condition as in FIG. 1. The power pill 66 is loaded by the spring 60 in the direction of the arrow as in FIG. 1 with the cup 62 upon the stem 64 of the power pill. Upon temperature rise in the manifold 74 the spring 76 loads the lower magnet 92 and the spring 78 loads the pole piece 46 to overcome the upper magnet 96 as will be hereinafter described. It will be further noted that service port 126 is open and interconnected with open outlet port 118, FIG. 1. As the temperature rises in the manifold the stem 64 starts rising from the thermal motor 66 and as it does it further compresses the already compressed spring 60 and commences to compress the upper magnet-loading spring 76 to load the same through the cup 62 and shoulder 53 of the sleeve 50. As the spring 76 compresses due to continued travel of stem 64, the spring transmits a greater and greater force through the spool 28 and to the magnet pole 96 until the magnet pole piece is lifted slightly from the lower cup 88. Such requires about four pounds in a given unit. With the pole slightly lifted from the magnet 92, the magnetic attraction between the pole and the magnet 92 is reduced drastically. As a result the spring 76 extends from its compressed condition. As the spring 76 extends upwardly it snaps the spool and pole piece 46 thereof upwardly, typically 0.055 inches, until the pole piece is attracted to and held by the upper cup 94 with typically and again a force of four pounds.

With the spool up and the pole piece held by the upper cup 96 it will be seen in FIGS. 2 and 3 that port 118 is blocked by reason of the corner of shoulder 45 in contact with the O-ring 122 and ports 100 and 126 are interconnected, for the corner of shoulder 43 is off the O-ring 106, FIGS. 2 and 3. With the ports 100 and 126 connected air pressure can flow to the clutch connected to service port 126 for actuation of the clutch. At this point it can be said that one-half of a complete cycle is completed.

Let it be assumed that the liquid in the manifold 74 cools. As a result the stem 64 retracts downwardly due to the loss of thermal energy. The retracted downward travel of the stem 64 of the pill is aided by the force of compression existing in the pill-loading spring 60. Simultaneously, the lower magnet-loading spring 78 is compressed with the force relinquished by the pill-loading spring 60 transferred to the lower magnet-loading spring 78. With the spring 78 bearing on the keeper 80 on the spool 28 the transferred force is transmitted through the spool to the pole piece 46 which unlatches from the upper cup 94 when approximately four pounds is built up in the lower magnet-loading spring 78 and the pole 46 is attracted to the magnet 92 in a given situation. Typically, such four pounds of force is concurrrent with a liquid temperature reduction of 8° F. and a stem retraction of 0.055 inches.

As above described, during the up stroke of the spool, the force of attraction between the magnet pole piece 96 drastically drops off as soon as the same begin to separate. The spring 78 then releases its stored energy and throws the spool and pole piece downward to the original position. Port 100 is then blocked and ports 126 and 118 are connected. A cycle is thus completed. Port 100 is blocked by reason of the corner of shoulder 43 in contact with O-ring 106, see FIG. 1.

I claim:

1. A snap action valve comprising:
   a. a valve housing having
   b. inlet, outlet and service ports
   c. a valve member carried by said housing and movable in opposite directions to selectable positions to connect said service port with either said inlet port or said outlet port,
   d. magnetic means mounted in said housing and including cooperating
   e. attracting and attractable magnetic members
   f. two of one type of said magnetic members being fixed relative to said housing,
   g. one of the other type being movable relative thereto and fixed relative to said valve member,
   h. guide means for guiding the movable magnetic member for movement toward or from the fixed magnetic member,
   i. valve operating means for movement of the valve member to a selected position whereby the magnetic means is brought into action to accelerate such movement,
   j. resilient means disposed between said valve member and valve operating means, effective when the valve member moves in one direction and
   k. other resilient means disposed between said valve and valve operating means effective when the valve member moves in the opposite direction.

2. A snap action valve according to claim 1 in which a. said valve member has a shoulder inwardly from its outer end and
b. another axially spaced shoulder at its outer end,
c. a sleeve slidable along said valve member between said shoulders, having
d. spaced shoulders intermediate the ends thereof and facing the shoulders on said valve member.
e. separate springs encircling said valve member and engaging said shoulders
f. and a spring acting between said sleeve valve member and housing.

* * * * *